(12) United States Patent
Pifer (10) Patent No.: US 8,944,100 B2
(45) Date of Patent: Feb. 3, 2015

(54) ISOLATION VALVE WITH FAST DEPRESSURIZATION FOR HIGH-PRESSURE FUEL TANK

(75) Inventor: Daniel Lee Pifer, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 992 days.

(21) Appl. No.: 13/011,511

(22) Filed: Jan. 21, 2011

(65) Prior Publication Data

US 2011/0240145 A1 Oct. 6, 2011

Related U.S. Application Data

(63) Continuation-in-part of application No. 12/749,924, filed on Mar. 30, 2010, now Pat. No. 8,584,704.

(51) Int. Cl.
- *F16K 31/10* (2006.01)
- *F16K 24/04* (2006.01)
- *F02M 25/08* (2006.01)
- *B60K 15/035* (2006.01)

(Continued)

(52) U.S. Cl.
CPC ........ *F16K 17/0413* (2013.01); *F02M 25/0836* (2013.01); *F16K 31/0655* (2013.01); *B60K 15/03519* (2013.01)
USPC ............ 137/599.11; 137/599.18; 137/630.22; 123/516; 123/519

(58) Field of Classification Search
CPC .................. F02M 25/0836; F02M 2025/0845; B60K 15/03519; F02D 41/004; F16K 31/0655; F16K 39/04; F16K 24/04
USPC ............... 137/512.2, 599.11, 599.18, 630.19, 137/630.22; 123/516, 519
See application file for complete search history.

(56) References Cited

U.S. PATENT DOCUMENTS

| 4,370,983 A | 2/1983 | Lichtenstein |
| 5,048,790 A | 9/1991 | Wells |

(Continued)

FOREIGN PATENT DOCUMENTS

| EP | 0713036 A1 | 5/1996 |
| EP | 2071217 A1 | 6/2009 |
| WO | 0190611 A2 | 11/2001 |

OTHER PUBLICATIONS

Yojiro Iriyama, Masahide Kobayashi, Takuji Matsubara, Yulisaku Nishimura, Ryosuke Nomura, and Takashi Ishikawa, "Design of a Fuel Vapor-containment System (FVS) to Meet Zero Evaporative Emissions Requirements in a Hybrid Electric Vehicle", SAE International, 2005-01-3825.

(Continued)

*Primary Examiner* — Atif Chaudry
(74) *Attorney, Agent, or Firm* — Dykema Gossett PLLC (57) ABSTRACT

An isolation valve includes a flow restrictor disposed in a passage and having a piston with a first orifice and a depressurization valve with a second orifice. The valve also includes a solenoid valve assembly having a coil that is selectively energized by a signal from a controller and an armature that is moveable between first and second positions to open and close the first orifice and/or the second orifice. When the coil is energized, the armature moves to the second position to allow vapor to flow through the first orifice, the depressurization valve selectively opens to allow vapor to flow through the first orifice, the second orifice, or both. The two orifices work together to provide controlled vapor flow.

15 Claims, 6 Drawing Sheets

(51) Int. Cl.
*F16K 17/04* (2006.01)
*F16K 31/06* (2006.01)

(56) References Cited

U.S. PATENT DOCUMENTS

| | | |
|---|---|---|
| 5,211,151 A | 5/1993 | Nakajima |
| 5,406,975 A | 4/1995 | Nakamichi |
| 5,605,177 A | 2/1997 | Ohashi |
| 5,967,183 A | 10/1999 | Detweiler et al. |
| 6,526,951 B2 | 3/2003 | Ishigaki et al. |
| 7,152,587 B2 | 12/2006 | Suzuki |
| 7,267,113 B2 | 9/2007 | Tsuge et al. |
| 7,270,310 B2 | 9/2007 | Takakura |
| 7,448,367 B1 | 11/2008 | Reddy et al. |
| 2001/0017160 A1 | 8/2001 | Ishigaki |
| 2005/0217734 A1 | 10/2005 | Takakura |
| 2006/0207663 A1 | 9/2006 | Tsuge |
| 2008/0042086 A1 | 2/2008 | Sisk et al. |
| 2010/0269921 A1 | 10/2010 | Pifer et al. |

OTHER PUBLICATIONS

European Patent Office, International Search Report issued in corresponding International Application No. PCT/IB2012/000079. Date of Mailing: Jul. 26, 2012.

ISOLATION VALVE WITH FAST DEPRESSURIZATION FOR HIGH-PRESSURE FUEL TANK

REFERENCE TO RELATED APPLICATIONS

This application is a continuation-in-part of U.S. patent application Ser. No. 12/749,924 filed on Mar. 30, 2010.

TECHNICAL FIELD

The present invention relates to a valve assembly for controlling fluid flow to and from a high-pressure fuel tank, and more particularly to such a valve assembly that can be depressurized quickly.

BACKGROUND OF THE INVENTION

High-pressure fuel tanks may use an isolation valve to open and close a vapor path between the fuel tank and a purge canister. In a typical evaporative emissions system, vented vapors from the fuel system are sent to a purge canister containing activated charcoal, which adsorbs fuel vapors. During certain engine operational modes, with the help of specifically designed control valves (e.g., vapor vent valves), the fuel vapors are adsorbed within the canister. Subsequently, during other engine operational modes, and with the help of additional control valves, fresh air is drawn through the canister, pulling the fuel vapor into the engine where it is burned.

For high-pressure fuel tank systems, an isolation valve may be used to isolate fuel tank emissions and prevent them from overloading the canister and vapor lines. The isolation valve itself may be a normally closed valve that is opened to allow vapor flow for tank depressurization or any other event where vapor release is desired. The vapor flow rate may be controlled to, for example, prevent corking of vent valves elsewhere in the emissions system.

There is a desire for an isolation valve that can be used in high-pressure fuel tanks and that can depressurize quickly in a controlled manner to allow user access to the fuel tank within a reasonable amount of time.

BRIEF SUMMARY OF THE INVENTION

An isolation valve according to one embodiment includes a flow restrictor disposed in a passage and having a piston with a first orifice and a depressurization valve with a second orifice. The valve also includes a solenoid valve assembly having a coil that is selectively energized by a signal from a controller and an armature that is moveable between first and second positions to open and close the first orifice and/or the second orifice. When the coil is energized, the armature moves to the second position to allow vapor to flow through the first orifice, and the depressurization valve selectively opens to allow vapor to flow through the first orifice, the second orifice, or both. The two orifices work together to provide controlled vapor flow.

An isolation valve according to another embodiment includes a flow restrictor disposed in a passage having sloped sides and having an orifice. A flow restrictor spring applies a biasing force on the flow restrictor to bias the flow restrictor to an open position. The valve also includes a solenoid valve assembly having a coil that is selectively energized by a signal from a controller, and an armature that is moveable between an extended position that overcomes the biasing force of the restrictor spring to move the flow restrictor to a closed position and to close the second orifice and a retracted position to open the orifice. When the coil is energized, the armature moves to the retracted position to allow vapor to flow through the orifice until the biasing force of the flow restrictor spring overcomes a vapor pressure. The depressurization valve opens to allow vapor to flow through the orifice and/or a space between the flow restrictor and the passage.

DETAILED DESCRIPTION OF THE INVENTION

Figure 1:
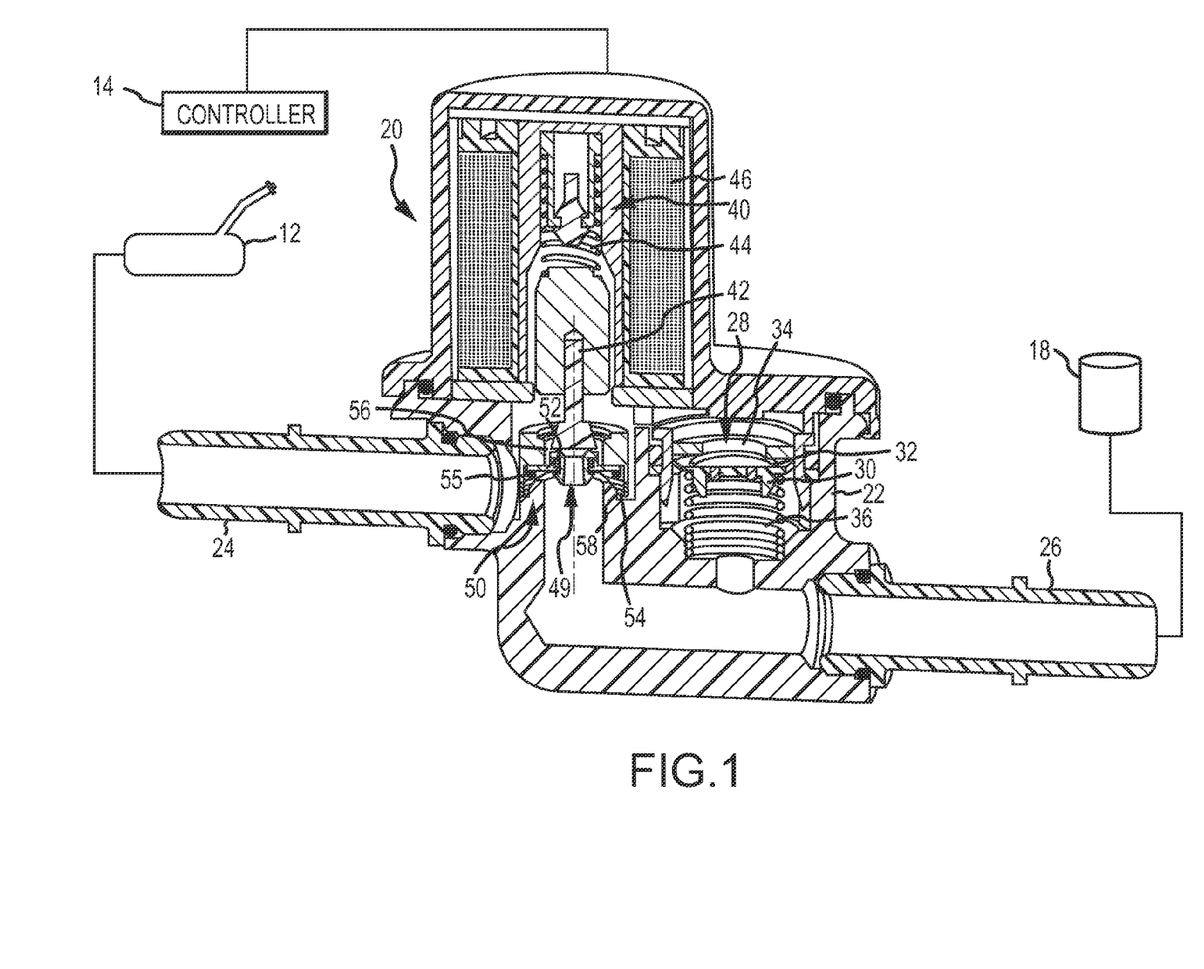
FIG. 1 is a cross-sectional view of a valve assembly configured for controlling fuel vapor flow between a fuel tank and a purge canister, with the valve shown in a completely closed state, according to one embodiment of the invention.

FIG. 1 illustrates a fuel system, schematically represented by numeral 10. The system 10 includes a fuel tank 12 and a controller 14 that may regulate the operation of an engine (not shown) and its fuel delivery system (not shown). Fuel tank 12 is operatively connected to an evaporative emissions control system that includes a purge canister 18 that may collect fuel vapor from the fuel tank 12 and subsequently release the fuel vapor to the engine. In addition, controller 14 may regulate the operation of a valve assembly 20 to selectively open and close the valve assembly 20, providing over-pressure relief and vacuum relief for the fuel tank 12.

The valve assembly 20 itself may control fuel vapor flow between the fuel tank 12 and the purge canister 18. Although the valve assembly 20 shown in the figures is located between the fuel tank 12 and the purge canister 18, nothing precludes locating the valve assembly 20 from being located elsewhere, such as between the purge canister 18 and the engine.

The valve assembly 20 may include a housing 22 that retains internal components of the valve assembly 20 in a compact manner. The valve assembly 20 may include a relief valve 28. The relief valve 28 may includes a piston 30, which may be formed from a suitable chemically-resistant material such as an appropriate plastic or aluminum. The relief valve 28 may also include a compliant seal 32, which may be formed from a suitable chemically-resistant elastomeric material. During operation, the seal 32 makes initial contact with the housing 22 along the seal's outer edge. After the initial contact with housing 22, the outer edge of seal 32 deflects to conform to the housing and seal a passage 34.

The piston 30 and the seal 32 may be combined into a unitary piston assembly via an appropriate manufacturing process, such as overmolding, as understood by those skilled in the art. The piston 30 and the seal 32 may be biased to close the passage 34. A spring 36 or other resilient member may bias the piston and the seal 32. The relief valve 28 may generally be used to open a vapor path between the fuel tank 12 and the purge canister 18 to relieve an extreme or over-pressure condition in the fuel tank 12. Additional details of the operation of the relief valve 28 in conjunction with the rest of the valve assembly 20 are described in commonly-assigned, co-pending U.S. patent application Ser. No. 12/749,924 filed on Mar. 30, 2010, the disclosure of which is incorporated by reference herein in its entirety. For purpose of the present application, the relief valve 28 and its operation are for illustrative purposes only and are not considered part of the present invention.

The description below will now focus on operation of the valve assembly 20, and particularly a solenoid assembly 40 and components that operate in conjunction with it, during a depressurization operation prior to refueling.

Figure 2:
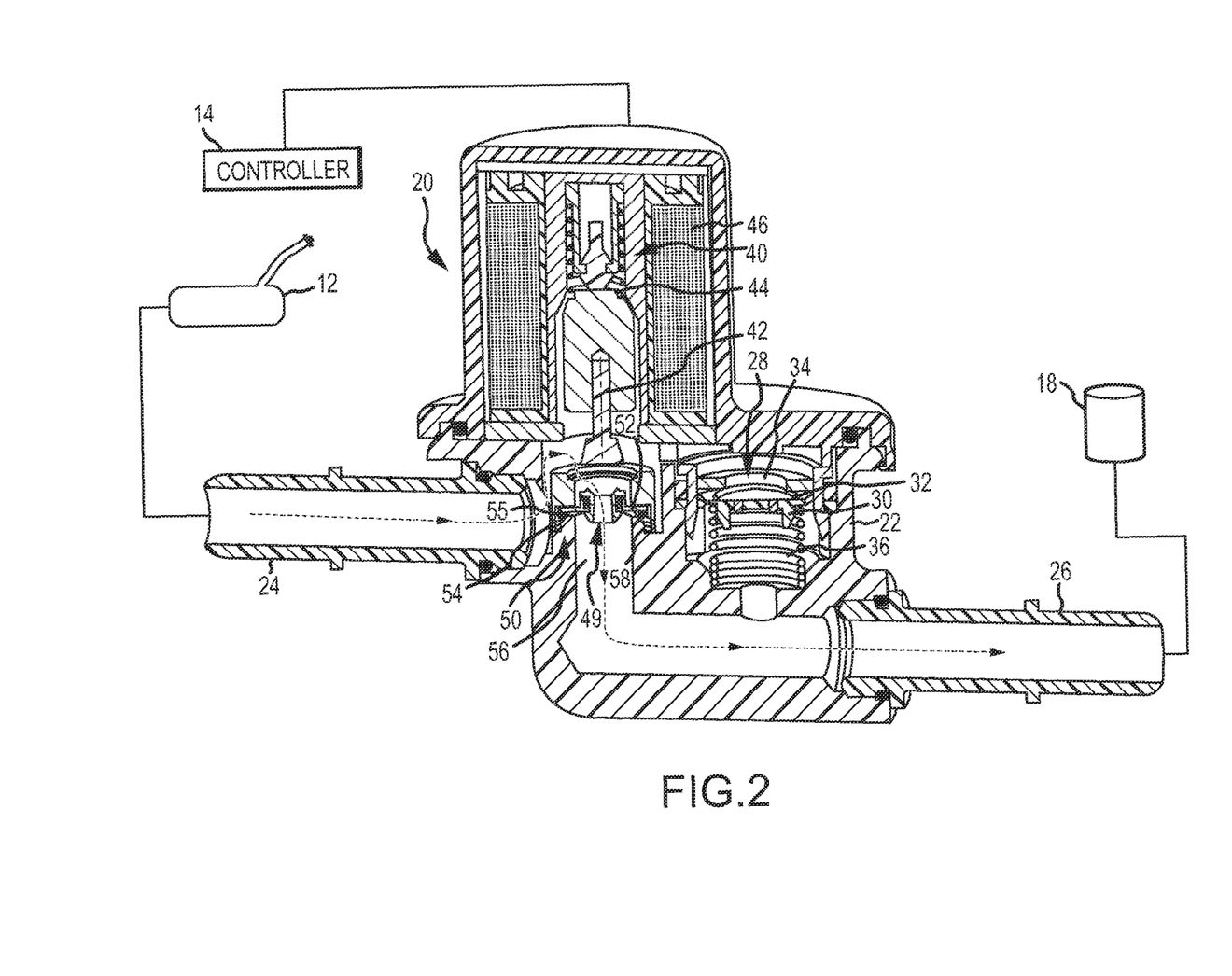
FIG. 2 is a cross-sectional view of the valve assembly shown in FIG. 1 when a solenoid in the valve assembly is energized during a start of a depressurization process conducted before refueling of the fuel tank.

The solenoid assembly 40 includes an armature 42, a solenoid spring 44, and a coil 46. The energization and de-energization of the coil 46 may be controlled by a signal from the controller 14. The solenoid spring 44 may generate a force sufficient to urge the armature 42 out of the solenoid assembly 40 when the coil 46 is not energized. When the coil 46 is energized, the resulting magnetic forces overcome the biasing force of the solenoid spring 44 and pull the armature 42 into the solenoid assembly 40, exposing a small orifice 49 in a flow restrictor 50 to allow vapor flow through the orifice 49 (FIG. 2).

In one embodiment, the flow restrictor 50 is arranged inside the housing 22 and includes a piston portion 52, which may be formed from a suitable chemically-resistant material such as an appropriate plastic or aluminum. The flow restrictor 50 may also include a compliant seal 55, which may be formed from a suitable chemically-resistant rubber. During valve operation, the seal 55 may initially contact the housing 22 along the seal's outer edge. After initial contact with the housing 22, the outer edge of seal 55 may deflect to conform to the housing 22 and hermetically close a passage 56 leading to the canister connector 26.

In one embodiment, the size of the small orifice 49 in the flow restrictor 50 is selected to allow only a selected amount of flow at a maximum specified tank pressure because the size of the passage 56 is too large to prevent "corking." More particularly, without the small orifice 49 slowing vapor flow through the passage 56, the force from rushing fuel vapors may force other valves in the system 10, such as a fuel limit vent valve (not shown) in the fuel tank 12, to "cork" into a closed position. Thus, the reduced size of the small orifice 49 in the flow restrictor 50 controls the vapor flow to a level that prevents corking. Note that vapor control may be desired for other purposes as well without Referring again to FIG. 2, when a user wishes to refuel the tank, the user may wish to depressurize the fuel tank first so that the potentially high pressure in the tank 12 is lowered to a specified acceptable level. However, the size of the small orifice 49 may restrict the vapor flow rate to a level that is not high enough to depressurize the tank in a reasonable amount of time. On the other hand, allowing unrestricted vapor flow through the isolation valve 10 may cause other valves in the system to cork, as explained above.

Figure 1A:
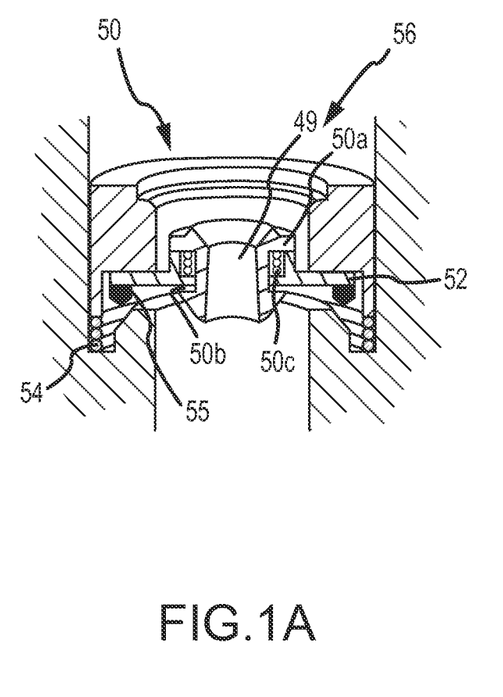
FIG. 1A is a magnified cross-sectional view of a depressurizing valve according one embodiment of the invention.

To provide closer control over vapor flow, the flow restrictor 50 may include a depressurization valve 50a, as shown in FIG. 1A, to allow faster tank depressurization. The depressurization valve 50a may be a poppet valve, wherein the small orifice 49 is in the poppet valve rather than the piston 52. The depressurization valve 50a may have its own associated seal 57 that seats against the piston 52. In this embodiment, the depressurization valve 50a is disposed in an intermediate orifice 50b in the piston 52. In one embodiment, the size of the intermediate orifice 50b is selected to allow increased vapor flow while still limiting the flow enough to prevent corking of fuel venting valves. The depressurization valve 50b is biased toward an open position by a depressurization spring 50c supported by the piston 52. In one embodiment, the spring 50c has a biasing force that is greater than the spring 54 biasing the flow restrictor 50 itself.

As a result, the flow restrictor 50 has two effective orifice sizes that may be opened when the solenoid assembly 40 is energized: (1) a small orifice 49 in the depressurization valve 50a that ensures vapor flow rate between the tank and the canister is less than a maximum flow rate to prevent corking of fuel tank venting valves during normal valve operation and (2) an intermediate orifice 50b in the piston 52 that, in combination with the small orifice 49, allows faster tank depressurization before a refueling operation. Also, the difference in biasing forces between the springs 54, 50c allows the depressurization valve 50b to open at a given vapor pressure while the flow restrictor 50 remains in a closed position, thereby allowing vapor to flow simultaneously through the small orifice 49 and the intermediate orifice 50b. The specific application of these features will be explained in greater detail below.

In one embodiment of the invention, a user may depressurize the tank by, for example, pushing a button on the interior of the vehicle to send a control signal from the controller 14. The signal energizes the coil 46, creating a magnetic force that withdraws the armature 42 to open the small orifice 49 and create a flow path through the flow restrictor 50 and the passage 56. Due to the high vapor flow rate created by the high tank pressure, there is enough initial force generated by the vapor flow to compress both springs 54, 50c, keeping the piston 52 and the depressurization valve 50a pushed downward against the large passage 56 and restricting flow only through the small orifice 49.

Figure 3:
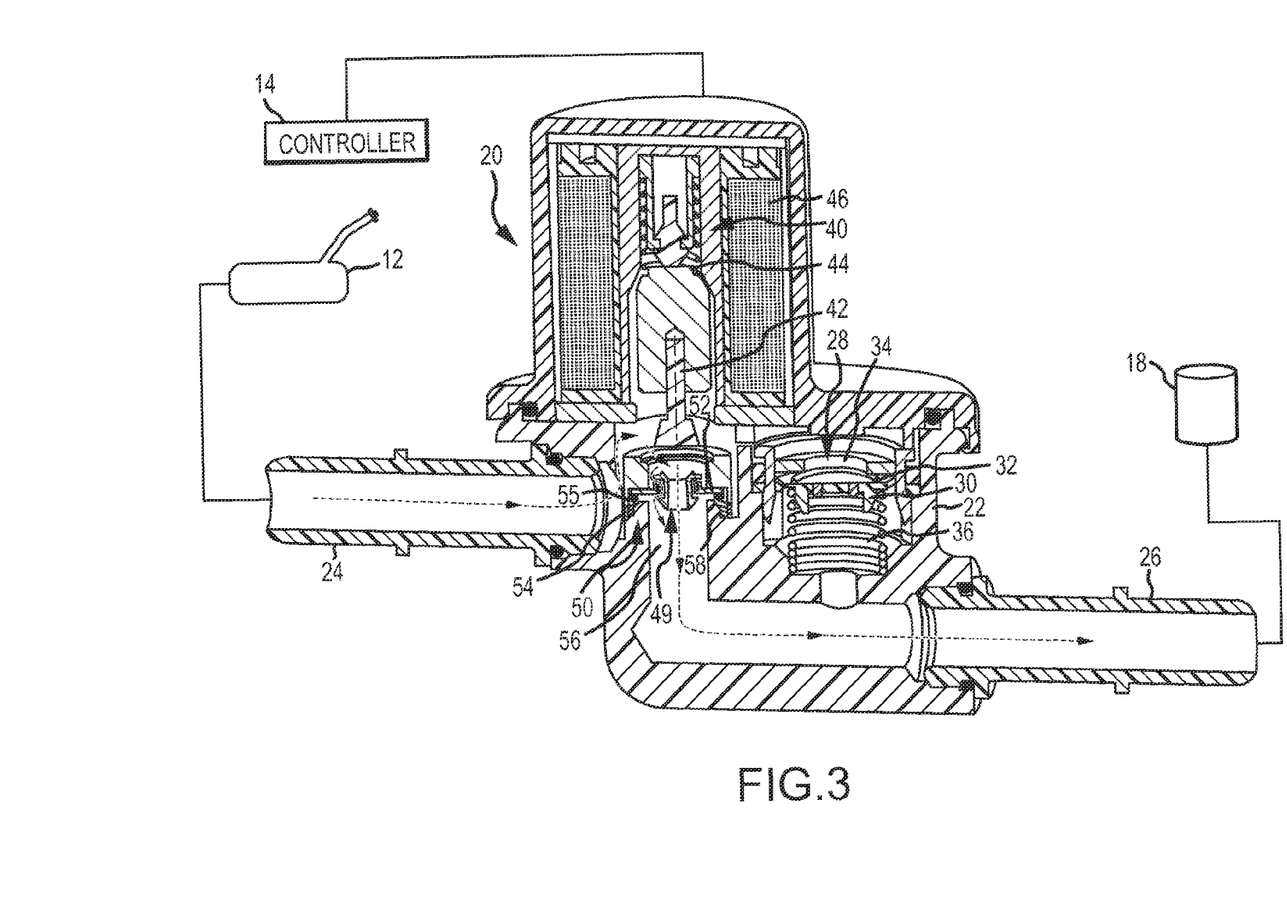
FIG. 3 is a cross-sectional view of the valve assembly shown in FIG. 1 when the solenoid is energized and the depressurizing valve is in an open position while the flow restrictor is in a closed position.

Referring to FIG. 3, since the spring force of the depressurization spring 50c biasing the depressurization valve 50a to an open position is larger than the spring force of the restrictor spring 54 biasing the flow restrictor 50 to an open position, and since the vapor pressure drops soon after a small amount of vapor escapes through the small orifice 49, the depressurization spring 50c forces the depressurization valve 50a to an open position, increasing the amount of vapor flow by creating two flow paths, one through the small orifice 49 and one through the intermediate orifice 50b (in the space between the depressurization valve 50a and the piston 52), out of the tank. The larger size of the intermediate orifice 50b allows an increased flow rate out of the tank, thereby allowing the tank to depressurize to a desired level quicker than through the small orifice 49 alone.

Figure 4:
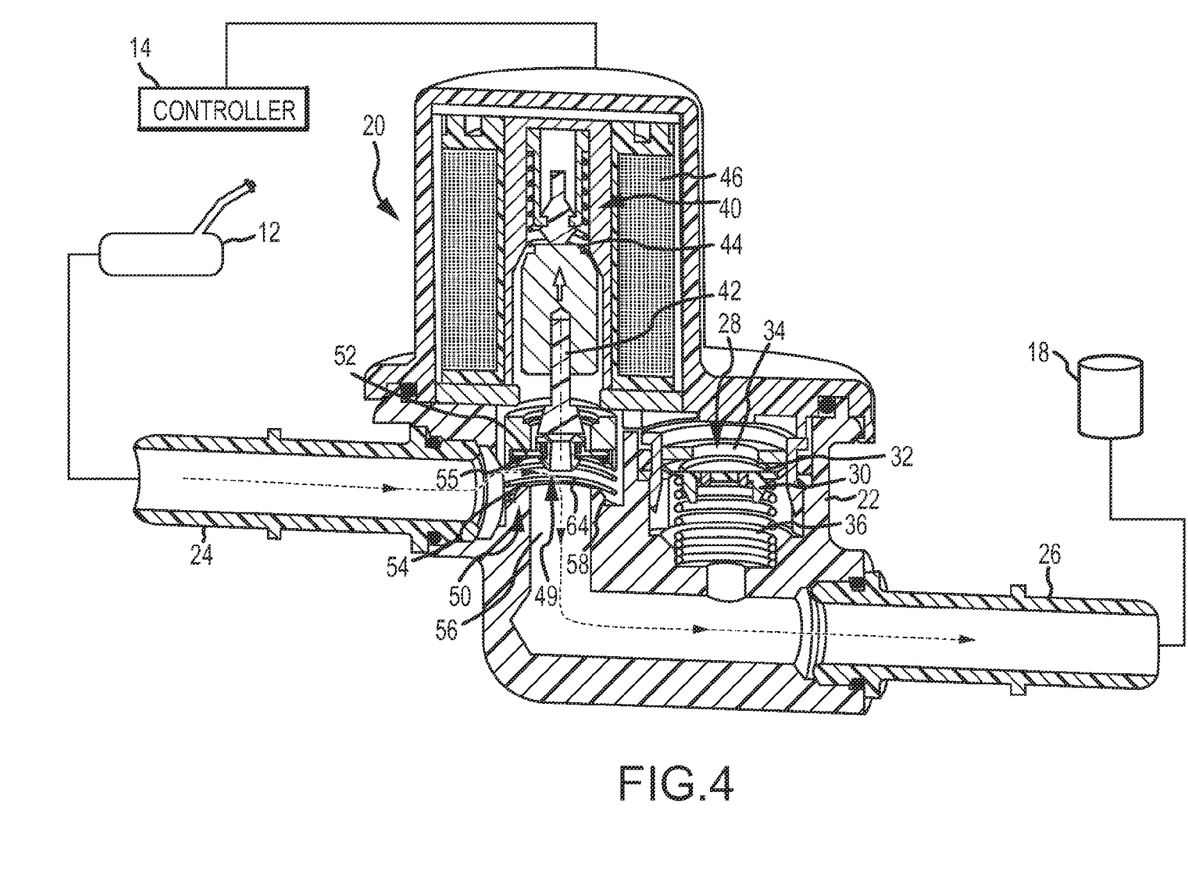
FIG. 4 is a cross-sectional view of the valve assembly shown in FIG. 1 where both the depressurizing valve and the flow restrictor are both in an open position.

Referring to FIG. 4, the vapor pressure may drop low enough so that the restrictor spring 54 overcomes the vapor pressure from the tank and pushes the flow restrictor 50 open as well, opening a flow path through the large passage 56. As shown in FIG. 4, the large passage 56 is exposed when armature 42 is withdrawn into solenoid assembly 40 in response to a tank depressurization signal noted above. This combination of lower tank pressure and withdrawn armature 42 allows the restrictor spring 54 to extend, pushing the flow restrictor 50 upward against the armature 42 to close the small orifice 49 and intermediate orifice 50b and open the large passage 56. At this point, there is no danger of corking in the fuel vent valves because the tank pressure is low enough to keep the vapor flow at a lower level during the final stages of the tank depressurization process.

As a result, the varying opening sizes 49, 50b, 56, used both alone and in combination, and the different biasing forces of the springs 44, 50c provide fast, yet controlled, tank depressurization while still keeping the vapor flow rate low enough to prevent corking of fuel vent valves in the emissions system.

Figure 5:
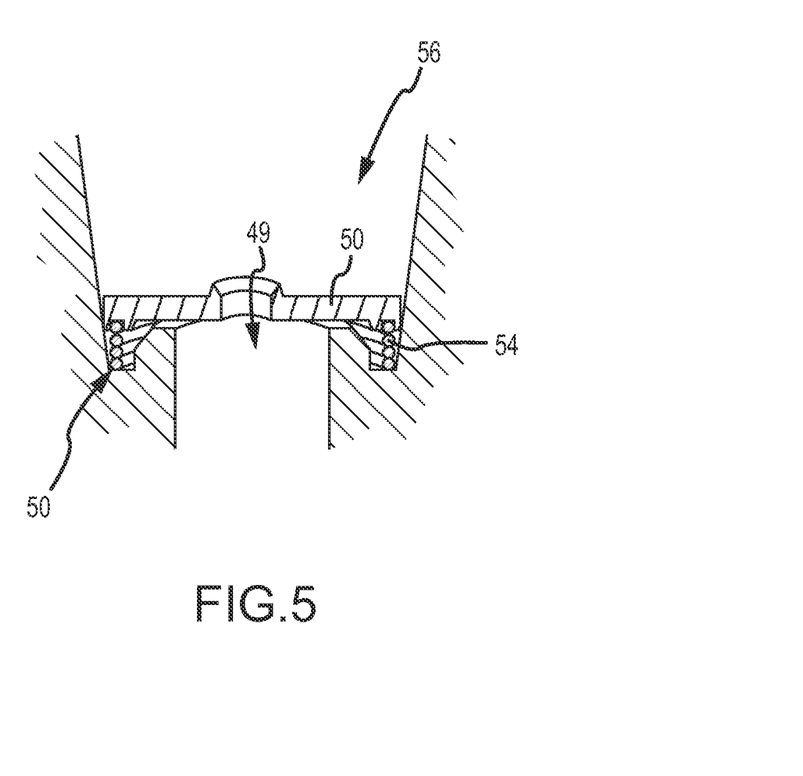
FIG. 5 is a cross-sectional view of a valve assembly according to another embodiment of the invention.

FIG. 5 shows an alternative embodiment for increasing the vapor flow rate through the valve assembly 20. This embodiment omits a separate depressurization valve and additional orifice sizes. Instead, this embodiment modifies the configuration of the passage 56 and the characteristics of the restrictor spring 54 to allow the vapor flow to increase gradually through the passage 56.

More particularly, the passage 56 may be funnel-shaped. When the coil 46 is initially energized to initiate tank depressurization, the armature 42 withdraws into the solenoid assembly 40, allowing vapor to initially flow through the small orifice 49. As the vapor pressure drops, the biasing force of the restrictor spring 54 lifts the piston 52 from the passage 56 to allow some of the vapor to bypass the flow restrictor 50 directly into the passage 56. However, the funnel shape of the passage 56 restricts the amount of vapor flowing through the passage 56, thereby preventing corking of the fuel vent valves. The restrictor spring 54 gradually forces the flow restrictor 50 up the funnel-shaped passage 56 to a wider point, which allows even more vapor to flow under the flow restrictor 50 into the passage.

In other words, the shape of the passage itself, in combination with the piston 52 diameter, naturally creates a passage with a variable size to control vapor flow. Thus, the combination of the funnel-shaped passage 56 and the selected biasing force of the restrictor spring 54 against the piston 52 gradually adjusts the amount of vapor released from the fuel tank while adjusting the vapor flow rate via the position of the flow restrictor 50 in the funnel-shaped passage to prevent corking of fuel vent valves in the emissions system.

While the best modes for carrying out the invention have been described in detail, those familiar with the art to which this invention relates will recognize various alternative designs and embodiments for practicing the invention within the scope of the appended claims.

What is claimed is:

1. An isolation valve, comprising:
   a flow restrictor disposed in a passage, the flow restrictor having
      a piston having a first orifice,
      a depressurization valve having a second orifice,
      a depressurization spring having a biasing force that biases the depressurization valve to an open position;
   a flow restrictor spring that applies a biasing force on the flow restrictor to bias the flow restrictor to an open position; and
   a solenoid valve assembly, having
      a coil that is selectively energized by a signal from a controller, and
      an armature that is moveable between (1) an extended position that overcomes the biasing force of the flow restrictor spring to move the flow restrictor to a closed position and to close at least one of the first orifice and the second orifice and (2) a retracted position to open at least one of the first orifice and the second orifice,
   wherein when the coil is energized, the armature moves to the retracted position to allow vapor to flow through the first orifice until a vapor pressure through the isolation valve drops below a first vapor pressure threshold,
   and wherein, when the depressurization spring overcomes the vapor pressure below the first vapor threshold, the depressurization valve opens to allow vapor to flow through at least one of the first orifice and the second orifice.

2. The isolation valve of claim 1, wherein the depressurization valve is a poppet valve.

3. The isolation valve of claim 1, wherein the depressurization valve is disposed in the first orifice, and wherein the second orifice is smaller than the first orifice.

4. The isolation valve of claim 3, wherein the armature closes the second orifice.

5. The isolation valve of claim 1, wherein vapor flows through both the first orifice and the second orifice when the depressurization valve is open.

6. The isolation valve of claim 1, wherein when the vapor pressure drops below a second vapor threshold, the biasing force of the flow restrictor spring opens the flow restrictor.

7. The isolation valve of claim 6 wherein the second vapor threshold is lower than the first vapor threshold and wherein the biasing force of the flow restrictor spring is lower than the biasing force of the depressurization spring.

8. The isolation valve of claim 1, wherein the armature contacts the flow restrictor and the depressurization valve when the vapor pressures is below the second vapor threshold such that the armature overcomes the biasing force of the depressurization spring and closes both the first and the second orifices.

9. The isolation valve of claim 1, wherein vapor flows through both the first orifice and the second orifice when the depressurization valve is open; and when the vapor pressure drops below a second vapor threshold, the biasing force of the flow restrictor spring opens the flow restrictor.

10. The isolation valve of claim 1, wherein when the vapor pressure drops below a second vapor threshold, the biasing force of the flow restrictor spring opens the flow restrictor; and the armature contacts the flow restrictor and the depressurization valve when the vapor pressures is below the second vapor threshold such that the armature overcomes the biasing force of the depressurization spring and closes both the first and the second orifices.

11. The isolation valve of claim 1, wherein the depressurization valve is disposed in the first orifice, and wherein the second orifice is smaller than the first orifice; and when the vapor pressure drops below a second vapor threshold, the biasing force of the flow restrictor spring opens the flow restrictor.

12. An isolation valve, comprising:
   a flow restrictor disposed in a passage, the flow restrictor having
      a piston having a first orifice,
      a depressurization valve having a second orifice; and
   a solenoid valve assembly, having
      a coil that is selectively energized by a signal from a controller, and
      an armature that is moveable between a first position to close at least one of the first orifice and the second orifice and a second position to open at least one of the first orifice and the second orifice,
   wherein when the coil is energized, the armature moves to the second position to allow vapor to flow through the first orifice,
   and wherein the depressurization valve selectively opens to allow vapor to flow through at least one of the first orifice and the second orifice, the depressurization valve is disposed in the first orifice, and the second orifice is smaller than the first orifice.

13. The isolation valve of claim 12, wherein the armature closes the second orifice.

14. An isolation valve, comprising:
   a flow restrictor disposed in a passage, the flow restrictor having a piston having a first orifice,
a depressurization valve having a second orifice,
a depressurization spring having a biasing force that biases the depressurization valve to an open position;
a flow restrictor spring that applies a biasing force on the flow restrictor to bias the flow restrictor to an open position; and
a solenoid valve assembly, having
  a coil that is selectively energized by a signal from a controller, and
  an armature that is moveable between (1) an extended position that overcomes the biasing force of the flow restrictor spring to move the flow restrictor to a closed position and to close at least one of the first orifice and the second orifice and (2) a retracted position to open at least one of the first orifice and the second orifice,
wherein when the coil is energized, the armature moves to the retracted position to allow vapor to flow through the first orifice until a vapor pressure through the isolation valve drops below a first vapor pressure threshold,
wherein, when the depressurization spring overcomes the vapor pressure below the first vapor threshold, the depressurization valve opens to allow vapor to flow through at least one of the first orifice and the second orifice,
wherein the depressurization valve is a poppet valve,
wherein the depressurization valve is disposed in the first orifice, and
wherein the second orifice is smaller than the first orifice.

15. The isolation valve of claim 14, wherein when the vapor pressure drops below a second vapor threshold, the biasing force of the flow restrictor spring opens the flow restrictor.

* * * * *